United States Patent [19]

Welstead et al.

[11] Patent Number: 5,039,210

[45] Date of Patent: Aug. 13, 1991

[54] EXTENDED DYNAMIC RANGE ONE DIMENSIONAL SPATIAL LIGHT MODULATOR

[75] Inventors: Stephen T. Welstead, Huntsville, Ala.; Michael J. Ward, Griffiss AFB, N.Y.

[73] Assignee: The United States of America as represented by the Secretary of the Air Force, Washington, D.C.

[21] Appl. No.: 547,557

[22] Filed: Jul. 2, 1990

[51] Int. Cl.$^5$ .............................................. G06K 7/10

[52] U.S. Cl. ...................................... 359/36; 359/246; 235/454

[58] Field of Search ................. 350/384, 330; 235/454

[56] References Cited

U.S. PATENT DOCUMENTS

| | | | |
|---|---|---|---|
| 4,715,683 | 12/1987 | Gregory et al. | 350/331 R |
| 4,813,761 | 3/1989 | Davis et al. | 350/162.15 |
| 4,815,799 | 3/1989 | Goldstein et al. | 350/1.1 |
| 4,867,543 | 9/1989 | Bennion et al. | 350/384 |
| 4,916,296 | 4/1990 | Streck | 235/454 |

OTHER PUBLICATIONS

Welstead, Stephen T. et al., "Adaptive Signal Processing Using a Liquid Crystal Television", Published in SPIE Proceedings, vol. 1154, Real Time Signal Processing XII, Aug. 1989.

*Primary Examiner*—Mark Hellner
*Attorney, Agent, or Firm*—William G. Auton; Donald J. Singer

[57] ABSTRACT

An optical information system which uses a liquid crystal television (LCTV) as a one dimensional spatial light modulator (SLM) is presented. An optical carrier wave is generated by polarizing and collimating the output of a laser. The liquid crystal television modulates the optical carrier wave with a digital modulating signal to output thereby a modulated optical signal: An array of photodetectors electroptically connects the modulated optical signal into a modulated electrical signal which is displayed on an oscilloscope. The use of an LCTV as a one dimensional SLM yields higher numerical accuracy and extended dynamic range than two dimensional SLM applications of the same equipment.

10 Claims, 5 Drawing Sheets

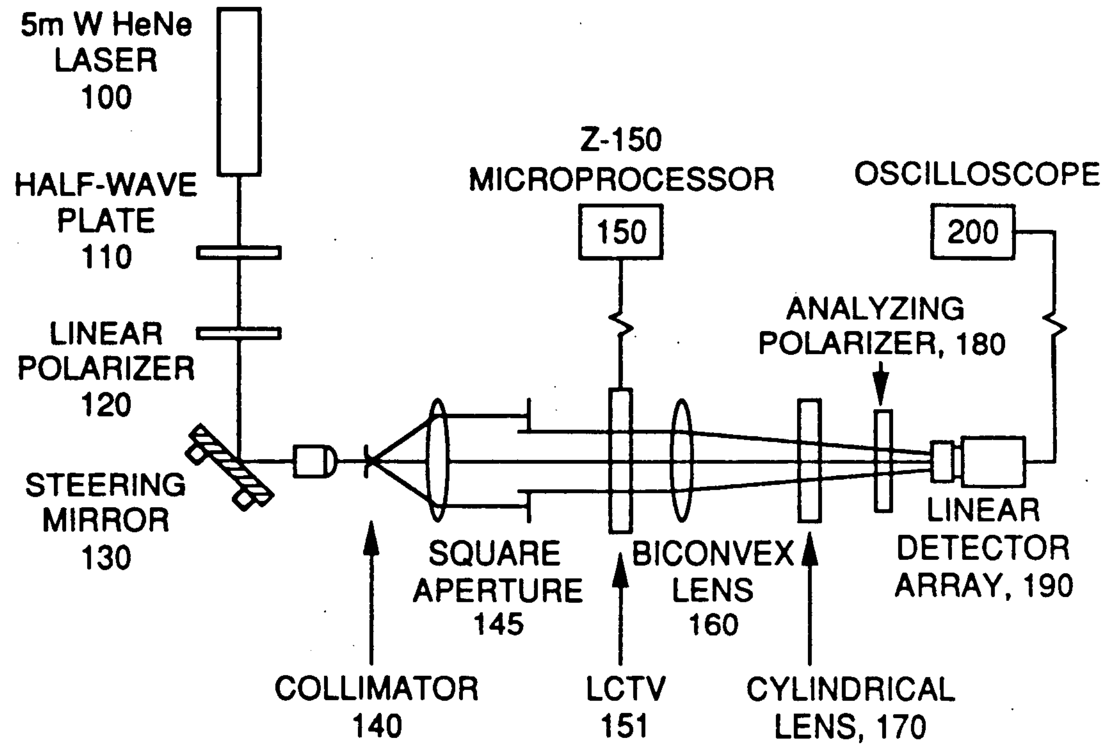
FIG. 1
FIG. 2
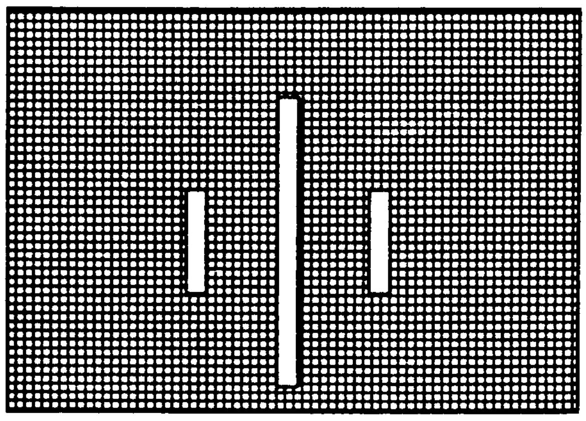
FIG. 3
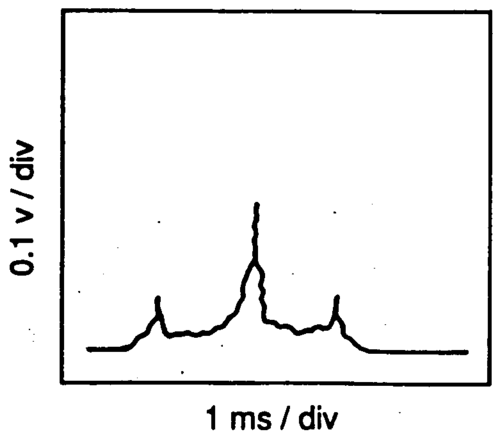

EXTENDED DYNAMIC RANGE ONE DIMENSIONAL SPATIAL LIGHT MODULATOR

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to analog optical information systems, and more specifically the invention pertains to a system which enhances the dynamic range of spatial light modulators used with analog optical processing systems, and optical data systems with linear arrays of numerical data.

In analog optical computing systems light is the information carrying medium. For such systems sufficient dynamic range is needed (ie., a number of resolvable information levels, rather than just the information of "on" and "off"). The purpose of this invention is to provide improved dynamic range in one dimension, so that a one dimensional array of nonnegative numbers can be accurately represented as a linear spatial light pattern. This spatial light representation of numbers can then be used as input to other optical computing components, such as acousto-optic cells or linear detector arrays. The spatial light pattern can remain fixed for an indefinite period of time, or can be dynamically changed many times per second. This is an electronically addressed device, so it also acts as an electronic-to-optic interface which can be used to accurately introduce one dimensional data into the optical realm from a digital electronic source.

Previous attempts to incorporate one dimensional spatial light modulation in analog optical computing architectures have taken one of four different approaches: use a one dimensional cross section of a 2-D spatial light modulator (SLM), essentially ignoring the second dimension; use a linear array of laser diodes or light emitting diodes (LEDs); use an acousto-optic cell; and use a fixed mask such as photographic film negative.

Each of these approaches has disadvantages. The 2-D SLM approach is probably the most common. Existing 2-D SLMs have been developed primarily for image processing applications, where a high degree of numerical accuracy is not needed. These devices are typically capable of representing between 2 and a maximum of 10 levels of numerical resolution (ie., a maximum of one decimal place of numerical accuracy). One dimensional spatial light modulation is achieved with these devices simply by considering only a linear cross section of the two dimensional output, thus effectively ignoring the second dimension. This one dimensional spatial light modulation thus suffers from the same low dynamic range as the two dimensional output of the device.

Electrically addressed 2-D SLMs include the Semetex SIGHT-MOD (magneto-optic spatial light modulator), the Texas Instruments Deformable Mirror Device, the Displaytech Ferroelectric Liquid Crystal (FLC) Display, and commercial light crystal television displays, such as those made by Radio Shack. Hughes makes the Liquid Crystal Light Valve, however this device is optically addressed, and so cannot serve as an electronic-to-optic interface.

Arrays of laser diodes or LEDs is another frequently proposed approach to 1-D spatial light modulation. If a large number of components in the linear array is desired (such as the 100 or more that our approach can provide), then the laser diode approach would be prohibitively expensive. LEDs are more economically feasible, but one must be concerned with the following potential drawbacks: incoherent light source (a problem if acousto-optic cells are to be used later in the system), nonuniformity among the LEDs, possible nonlinear response over input range, and low dynamic range. Also, physical spacing between LEDs or laser diodes may cause problems in some applications.

Acousto-optic cells can also be considered as one dimensional spatial light modulators. Modulation is produced by continually feeding an electronic signal into a transducer. This sends an acoustic wave through the crystal material of the device, producing a moving pattern of altered indices of refraction in the crystal. This moving pattern acts as a diffraction grating that modulates the intensity of the first diffracted order of the transmitted light. This type of modulation differs from the optical information modulation of the present concern in that it requires a continuous input of signal data, and it produces a continually moving spatial light pattern. It is not suitable for representing an array of numbers which can be either fixed or dynamically changing.

Fixed masks have been used for laboratory demonstrations that require one dimensional spatial light modulation. The problem with this approach is the obvious one that the modulation is fixed, and cannot be changed in real time.

The task for providing extended dynamic range for one dimensional spatial light modulation system is alleviated, to some extent, by the systems disclosed in the following U.S. Patents, the disclosures of which are specifically incorporated herein by reference;

U.S. Pat. No. 4,813,761 issued to Davis;
U.S. Pat. No. 4,815,799 issued to Goldstein; and
U.S. Pat. No. 4,867,543 issued to Bennion.

The patent to Davis (761) teaches high efficiency programmable diffraction gratings using a spatial light modulator. The patent to Goldstein (799) teaches a spatial light modulator responsive to infrared radiation. The patent to Bennion (543) teaches a spatial light modulator employing a solid ceramic material having high electro-optic coefficients.

While the prior art systems are instructive, a need remains to extend the dynamic range for one dimensional spatial light modulation information carrying systems. The present invention is intended to satisfy that need.

SUMMARY OF THE INVENTION

The present invention includes an optical information system which uses a liquid crystal television as a one dimensional spatial light modulator. In one embodiment of the invention, a laser outputs a laser beam which is used as an optical carrier wave after it is polarized and collimated. The liquid crystal television modulates the optical carrier wave with a digital modulating signal to output thereby a modulated optical signal.

The modulated optical signal from the liquid crystal television is electrooptically converted into a modulated electrical signal by an array of photodetectors. The modulated electrical signal is then readable by conventional display systems (such as an oscilloscope) to yield thereby the digital information that uses superimposed on the optical carrier wave by the liquid crystal television.

By using the liquid crystal television as a one dimensional spatial light modulator, the dynamic range has been demonstrated to exhibit a substantial increase over the dynamic range of two dimensional spatial light modulator systems. This increase of dynamic range represents a potential saving of digital data that could otherwise be lost due to interference from a variety of sources. Since only one dimensional modulation is needed to optically represent digital data, the present invention is able to take advantage of this inherent increase in dynamic range.

A microprocessor is used to control the liquid crystal television and supplies thereto the digital information that will serve as the digital modulating signal. Commercially available LCTV systems commonly have a jack for video input signals, and the microprocessor is connected to such a jack.

It is an object of the present invention to provide a one dimensional spatial light modulation system which has enhanced dynamic range characteristics.

It is another object of the present invention to provide an optical information system which uses a liquid crystal television as a one dimensional spatial light modulator.

These objects together with other objects, features and advantages of the invention will become more readily apparent from the following detailed description when taken in conjunction with the accompanying drawings wherein like elements are given like reference numerals throughout.

DESCRIPTION OF THE DRAWINGS

FIG. 1 is a block diagram of an application of the present invention;

FIG. 2 is a sample pattern on a two dimensional SLM array produced by the system of FIG. 1;

FIG. 3 is a chart of an oscilloscope trace showing one dimensional modulation corresponding to the pattern of FIG. 2;

DETAILED DESCRIPTION OF THE PREFERRED EMBODIMENT

Figure 4:
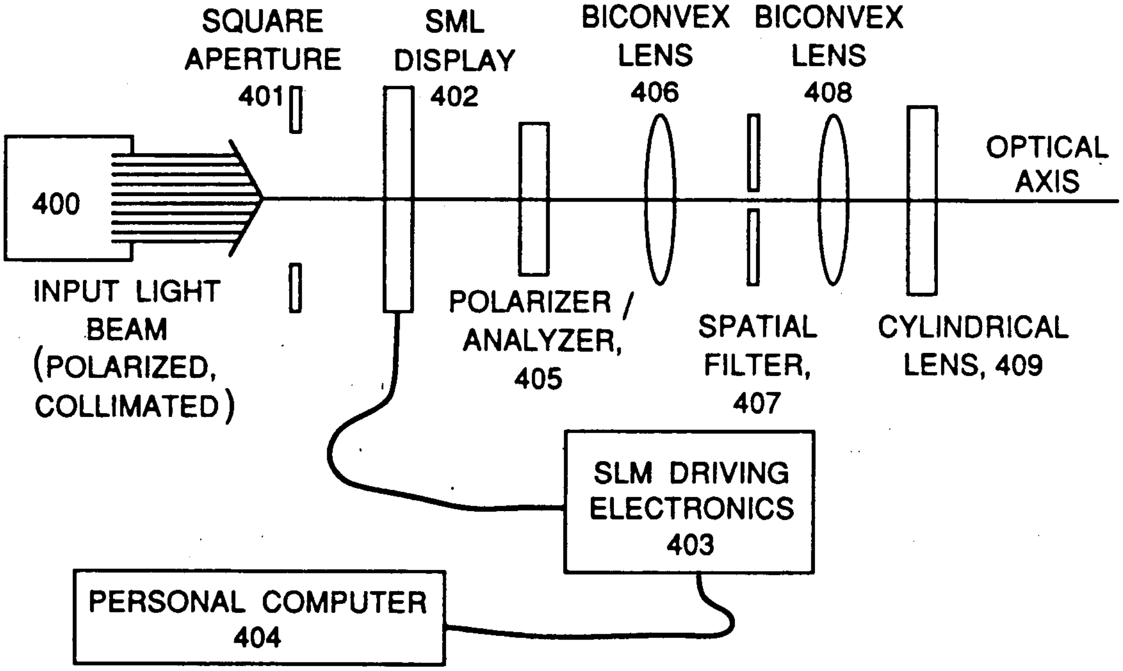
FIG. 4 is a top view of a block diagram of an extended dynamic range one dimensional spatial light modulator.

The present invention includes a system which measurably extends the dynamic range of one dimensional spatial light modulator systems when used in analog optical information systems. This device produces extended dynamic range one dimensional spatial light modulation using a two dimensional spatial light modulator (SLM) which is assumed to have only binary modulation capability. The device can be used to accurately represent a one dimensional array of nonnegative numbers as a spatial light pattern, for example in optical signal processing applications. For example, if a 2-D SLM is available with a display area consisting of 100×100 binary pixels, the architecture we present here can represent a 100 component linear vector with 100 distinct levels of modulation in each component. Thus, numerical data can be represented with up to two decimal places of accuracy. This numerical data can remain in a fixed optical pattern, or it can be changed in real time, with update rates depending on the frame speed of the 2-D SLM.

The reader's attention is now directed towards FIG. 1 which displays the entire experimental apparatus used to test the invention. The source was 5 mW HeNe laser 100 which used at 632.8 nm. This was followed by a waveplate 110 and a linear polarizer 120 which are used to orient the polarization for optimal throughput. A mirror 130 redirected the beam into a Newport LCV Light Collimator 140 with a 60× objective and a 10 micrometer spatial filter. The collimated beam, approximately 2" in diameter, was then incident on a 1.12"×1.12" square aperture 145. The square collimated beam was then passed through a transmissive spatial light modulator display 151. For this first test, we used a Radio Shack Model 16156 Liquid Crystal Television (LCTV) 151 which had been modified for this purpose by removing its plastic polarizing sheets and positioning its display in an upright manner. The pattern shown in FIG. 2 was written on the LCTV display. This pattern was generated with a Zenith model 150 microprocessor 150 and sent to the LCTV 151 via its video input jack. The light transmitted through the LCTV 151 was sent through a 3" diameter biconvex lens 160 with a 500 mm focal length. A cylindrical lens 170 of focal length 250 mm then focused the light in the vertical direction and onto a 512 element EG&G Reticon photodiode array 190. The output of the diode array 190 was then observed on an oscilloscope 200.

For the particular pattern shown in FIG. 2, one would expect to see three peaks in the oscilloscope, with the ratio of the height of the central peak to the height of the side peaks being 3:1. FIG. 3 shows the actual oscilloscope trace. We do, in fact, have three peaks with the large center peak being approximately 3 times the height of the side peaks. This test showed that one could, in fact, achieve extended dynamic range in one dimension from a device that has only a 2:1 dynamic range in two dimensions.

The reader's attention is now directed towards FIG. 4 which is an illustration of the present invention. The incident light source 400 is assumed to be a linearly polarized collimated coherent beam of sufficiently large diameter to fully illuminate the square aperture (1). We use a HeNe laser light source, operating at a wavelength of 632.8 nm (neither this wavelength nor, in fact, the coherence of the light are critical to the operation of this invention, although coherence is desirable if the output is to interact with acousto-optic cells). The laser beam source 400 includes linear polarizer and a beam expander/collimator which processes the laser beam before introduction into the square aperture 401, which is the first actual component of our invention.

The light which passes through the square aperture 401 then illuminates the spatial light modulator (SLM) display 402. The SLM is a type with a transmissive (as opposed to reflective) display, whose activated pixels achieve spatial light modulation through rotation of polarized light. We assume only binary operation of each pixel. The number of horizontal pixels determines the number of vector components that can be represented, while the number of vertical pixels determines the numerical accuracy, as discussed below. We have used a Radio Shack liquid crystal television display and the Semetex Sight-Mod as SLM's in this configuration. The Displaytech FLC display also appears to be a suitable SLM for this design.

The SLM display 402 has written upon it a pixel pattern corresponding to the numerical array that is to be represented. This pattern is formulated within the personal computer 404 by software.

This software has as its input a one dimensional vector of nonnegative numbers, which may come from data acquisition or some other digital source. The software converts this to a two dimensional pattern, for output to the display of the SLM. Horizontal position in this pattern corresponds to vector component number. For example, if there are 100 total components, then the 50th component would be located halfway across the pattern. The vertical dimension is used to represent the numerical value of each vector component. To do this, we simply turn "on" a number of pixels that is proportional to the value of the vector component, where "on" means that the incident light light is transmitted through the pixel and "off" means that the light does not pass through the pixel. A maximum component value must be predetermined so that values can be expressed relative to this maximum. For example, if the maximum is 1.0, and we wish to express the value 0.8, we would turn on 80% of the vertical pixels in the column corresponding to this component. Vertical summing, performed optically by a cylindrical lens later on in the system, will then produce an optical intensity corresponding to 0.8.

This pattern is sent to the SLM via its driving electronics 403. Incident light passes through the SLM display 402 and then through an analyzing polarizer 405. Because of the polarizing effect of the SLM display, the light now carries a visible spatial pattern. We have found that operation is improved if this light is sent through a spatial filter 407. A biconvex lens 406 is used to focus onto this filter. The filter 407 consists of an opaque material with a pinhole, approximately 0.5-1 mm in diameter. The purpose of this filter, located in the Fourier transform plane, is to remove high spatial frequency components from the light pattern. These high frequency components can occur as a result of light leakage around the pixels of the SLM.

A second biconvex lens 408 collimates the output of the spatial filter. Finally, the light passes through a cylindrical lens 409, which sums the light pattern in the vertical direction. it is this summing which produces a one dimensional strip of light with varying intensity along its length corresponding to the numerical values of the vector components. This one dimensional strip of spatially modulated light is the output of this invention.

The advantage of this device is that it provides higher dynamic range one dimensional spatial light modulation than other known existing SLMs. The response is linear across this range, and uniform along the one dimension.

The feature that is new here is that we are taking advantage of the second dimension of a two dimensional SLM to improve dynamic range and accuracy of numerical representation in one dimension.

There are several possible alternative modes of operation. The spatial filter 407 with its accompanying lenses 408 and 406 are not essential, and the system may be operated without it. As mentioned above, the choice of light source wavelength and coherence is not significant to the concept of this device. Other wavelengths, or noncoherent sources, can be used, provided they are compatible with the optics.

As described above, the present invention includes the use of a two dimensional liquid crystal display to provide extended dynamic range for one dimensional spatial light modulation, this use of the device in an adaptive signal processing application which requires high accuracy representation of a one dimensional weight vector. One dimension of the television display screen is used to specify the components of the vector. The second dimension is used to provide increased numerical accuracy for each of these components. In this way, we overcome the recognized low dynamic range and limited number of gray scales that is characteristic of liquid crystal displays at the pixel level. Preliminary experimental results verifying this use of the liquid crystal television as an improved accuracy spatial light modulator were presented.

A more detailed explanation behind the operation of the present invention was presented in the technical article published by Stephen Welsted which was entitled "Adaptive signal processing using a liquid crystal television," in Proceedings of SPIE, Real Time Signal Processing XII, in fall 1989, the disclosure of which is incorporated herein by reference. Information from this article is summarized below.

As mentioned above, signal processing applications of spatial light modulation requires a higher degree of numerical accuracy that other applications. The present invention solves this problem using one dimension of the two dimensional LCTV display screen to specify the components of the vector. That is, spatial position in this dimension indicates which component of the vector is to be assigned a numerical value. The second dimension of the screen is used to represent the numeric value that is to be assigned to each vector component. This provides an increased effective dynamic range and effective resolution for the representation of these values. In other words, from the second dimension of the LCTV, we obtain the ability to represent more numbers, or, equivalently, obtain more decimal places of accuracy, than is possible with such a service at the pixel level.

The signal processing application applied here is adaptive noise cancellation. Our algorithm, however, is a variation of the steepest descent algorithm, rather than the least mean square (LMS) algorithm.

A main antenna receives both the signal of interest, s(t), and a noise signal n(t) whose exact characteristics are unknown. The total signal received at the main antenna is thus $$d(t)=s(t)+n(t).$$

The problem is to construct a signal y(t) which is an estimate of n(t), so that the signal e(t), defined by $$e(t)=d(t)-y(t)$$

is approximately equal to s(t).

The information that is available to construct y(t) comes from an omni-directional side antenna. We will use just one such antenna input in our architecture, although, in practice, several are used. The assumption is that the main antenna noise n(t) is a combination of different delayed versions of the signal $n_1(t)$ received by the side antenna. It is also assumed that s(t) and $n_1(t)$ are uncorrelated. Thus, we attempt to construct y(t) in the form $$y(t) = \sum_{i=1}^{M} w_i n_1(t - (i - 1)\Delta t). \quad (1)$$

Here, Δt is the discrete time delay increment. The one dimensional vector $$\underline{w} = (w_1, \ldots, w_M)$$

is called the weight It is this vector that we wish to represent optically using the LCTV. It is assumed that this vector changes slowly in time, compared to the signal modulation. We are interested, however, in having the algorithm adapt to changes in the weights over time.

The weight vector is to be chosen so as to minimize the energy of e(t). In theory, this energy is is supposed to be minimized over all time. However, in a practical adaptive formulation of this problem, we must settle for minimization over a fine time interval from T— to the current time T, for some fixed. The minimization problem leads to a linear equation involving a covariance matrix. Iterative methods can be used to solve this equation. We choose an adaptive version of the steepest descent algorithm that is amenable to optical implementation. The adaptive version of this algorithm can be written in the form of Equation 2.

$$w_i^{(N+1)} = \quad (2)$$

$$w_i^{(N)} + a_N \int_{N\tau}^{(N+1)\tau} (d(t) - y^{(N)}(t)) n_1(t - (i - 1)\Delta t) dt$$

$$i = 1, \ldots M.$$

Here, $w_i^{(n)}$ is the $i^{th}$ component of the $n^{th}$ iterate of the weight vector, $y^{(n)}(t)$ is the signal given by Equation 1 with $w_i^{(N)}$ in place of $w_1$, and $a_N$ is the scalar stepsize used to control convergence speed. The stepsize can be fixed or can be made vary dynamically with the iterations.

The algorithm of Equation 2 is what will be implemented in the electro-optical architecture presented in the discussion below. It should be pointed out that Equation 2 differs from the LMS algorithm due to the time integration in the second term on the right.

Figure 5:
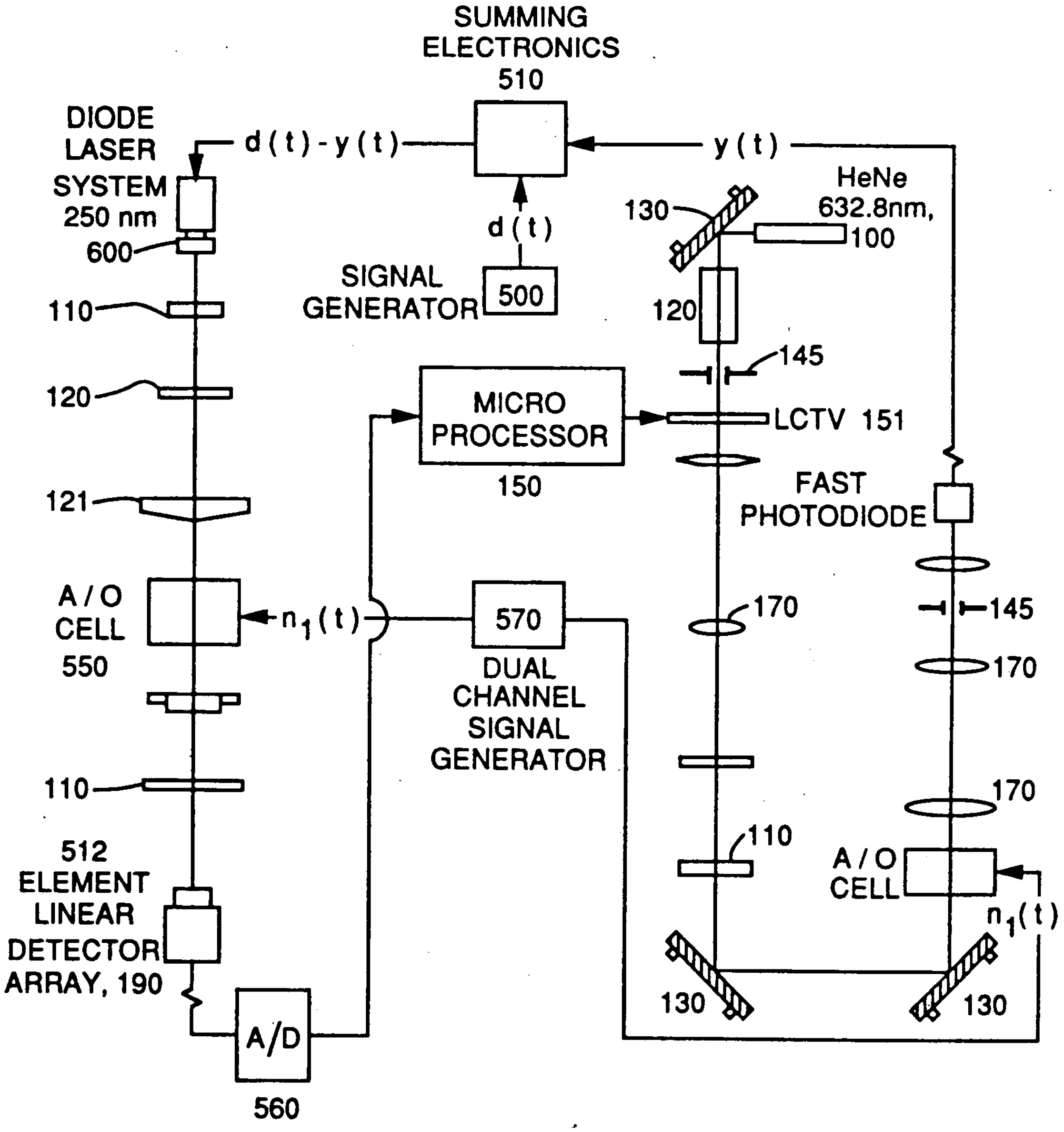
FIG. 5 is a block diagram of the system architecture of another embodiment of the present invention.

The electro-optical architecture for implementing the algorithm Equation 2 is shown in FIG. 5. This architecture can be thought of as consisting of two optical subsystems connected by a microcomputer 150 in a feedback loop. The first optical subsystem forms updates to the weight vector. The second optical subsystem uses an LCTV 151 to recombine the weight vector with delayed versions of the side signal to form the estimated noise signal y(t).

The weight update vector is the vector whose $i^{th}$ component is given by the integral in Equation 2. These vector components are formed optically in parallel, using an acousto-optic (A/O) cell 550 as a tapped delay line, and a charge coupled device (CCE) linear array 190 to perform the time integration. The weight vector changes relatively slowly in time (compared to the signal modulation rates), so it is feasible to collect this information with a CCD array and then send it to the microcomputer via an analog to digital (A/D) converter.

The microcomputer 150 performs the iteration step, forming the new weight vector by adding the weight update vector to the previously stored weight vector. The ability to retain previous weight information without degradation is an important advantage of this digital part of the system, as opposed to an all analog system. The microcomputer 150 also uses weight update information to make an intelligent decision for computing the optimum value for the stepsize $a_N$ on each iteration. Finally, and most significantly, the microcomputer 150 is used to form the video output containing the special weight pattern information that will be displayed on the LCTV 151.

A collimated HeNe beam illuminates the LCTV 151. Light passing through the LCTV 151 is summed vertically by a cylindrical lens 170 resulting in a one dimensional spatially modulated beam which, as described below, represents the weight vector. The estimated noise signal y(t) is formed by using an A/O cell 550 to combine this weight vector with delayed versions of $n_1(t)$ and spatially summing the result with a spherical lens.

As mentioned above, the present invention does the following to represent the weight vector as a pattern on the LCTV screen. The horizontal position across the screen corresponds to the particular component. The second screen dimension, namely the vertical direction, is used to represent the numerical value for each component. For example, if there are 100 total weight components, then the value for $w_{50}$ is located halfway across the screen. A simple addressing scheme in the microcomputer can be used to translate component number into horizontal position on the screen (some consideration must be given, however, to the fact that the pixel grid structure of the LCTV does not correspond exactly to the pixel layout of the computer monitor). To represent the numerical value of this component, we simply turn "on" a number of vertical pixels that is proportional to the value. (For the purposes of our application problem, it is sufficient to consider weight values between 0 and 1 only). This pattern is generated in the microcomputer and shipped to the LCTV using the LCTV's normal driving electronics.

The LCTV we use is an inexpensive commercially available device. Following the prior art mentioned above, we have modified the device by replacing the polarizing sheets with optical quality polarizers, and positioning the display in an upright manner so that it operates in a transmissive mode. The TV comes with a jack for video input, so that it can receive, for example, a video signal directly from the microcomputer.

The LCTV display is illuminated from behind by a collimated HeNe beam. The amount of light transmitted through a vertical column corresponding to a single weight component is then proportional to the numerical value of that component. This light is then summed in the vertical direction by a cylindrical lens. The result in the focal plane of this lens is a horizontal strip of light with spatial modulations corresponding to the values of the weight components. This concept is illustrated in FIG. 6.

Figure 6:
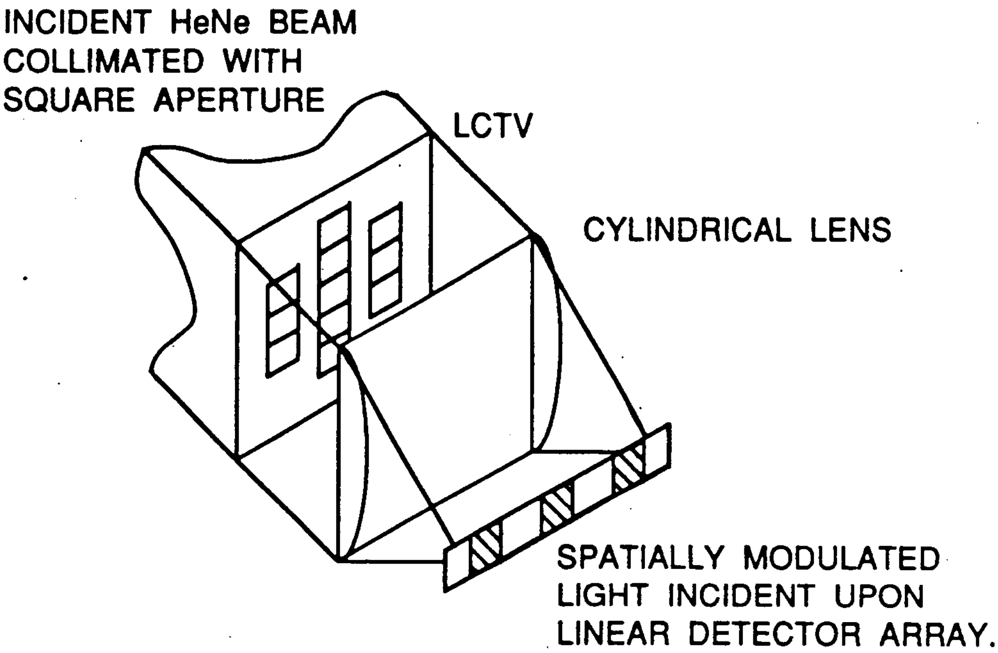
FIG. 6 is a detailed view of the use of an LCTV as a one dimensional SLM.

FIG. 6 shows the LCTV illuminated by the collimated HeNe beam, a cylindrical lens summing in the vertical direction the output from the LCTV, and the spatially modulated strip of light focused onto a linear detector array. This is the setup used to carry out the experiment described below. The detector array is used for measurement purposes only in this experiment. In the system architecture shown in FIG. 5, this detector is not present, and the output of the cylindrical lens is focused onto an A/O cell.

In this way, we hope to achieve at least 100 gray levels for representing the weight values. Preliminary experimental results reported below show that 24 gray levels are easily achieved in this manner using only the "on"—"off" gray levels of the pixels and a coarse translation scheme for converting numbers to pixel patterns (ie., increments of 5 LCTV pixels at a time were used). We hope to improve this figure by introducing a finder translation scheme and perhaps making use of the intermediate gray scale available at the pixel level. A modification of the drive electronics of the TV may also help to improve dynamic range.

FIGS. 2 and 3 illustrate this use of the LCTV as a one dimensional SLM. The sample weight pattern shown in FIG. 2 was generated by the microcomputer in CGA graphics mode ( a total of 320 horizontal pixels and 200 vertical pixels for the entire computer monitor screen). The large center pattern is an area of $8\times 84$ "on" pixels, while the two smaller patterns are areas of $8\times 28$ "on" pixels. These are pixel numbers on the computer monitor screen. The LCTV has a total of 162 horizontal pixels and 149 vertical pixels for its entire screen, and so the pixel numbers for it will be less. The relative size of the larger pattern to the smaller ones is thus 3:1.

The light transmitted through the "on" pixels was summed in the vertical direction by the cylindrical lens and focused onto the linear detector array, as shown in FIG. 1. FIG. 3 shows the oscilloscope trace of the detector output. One can see that the height of the large peak is very nearly 3 times the height of the smaller peaks. We are thus obtaining one dimensional spatial light modulation from the LCTV.

Figure 7:
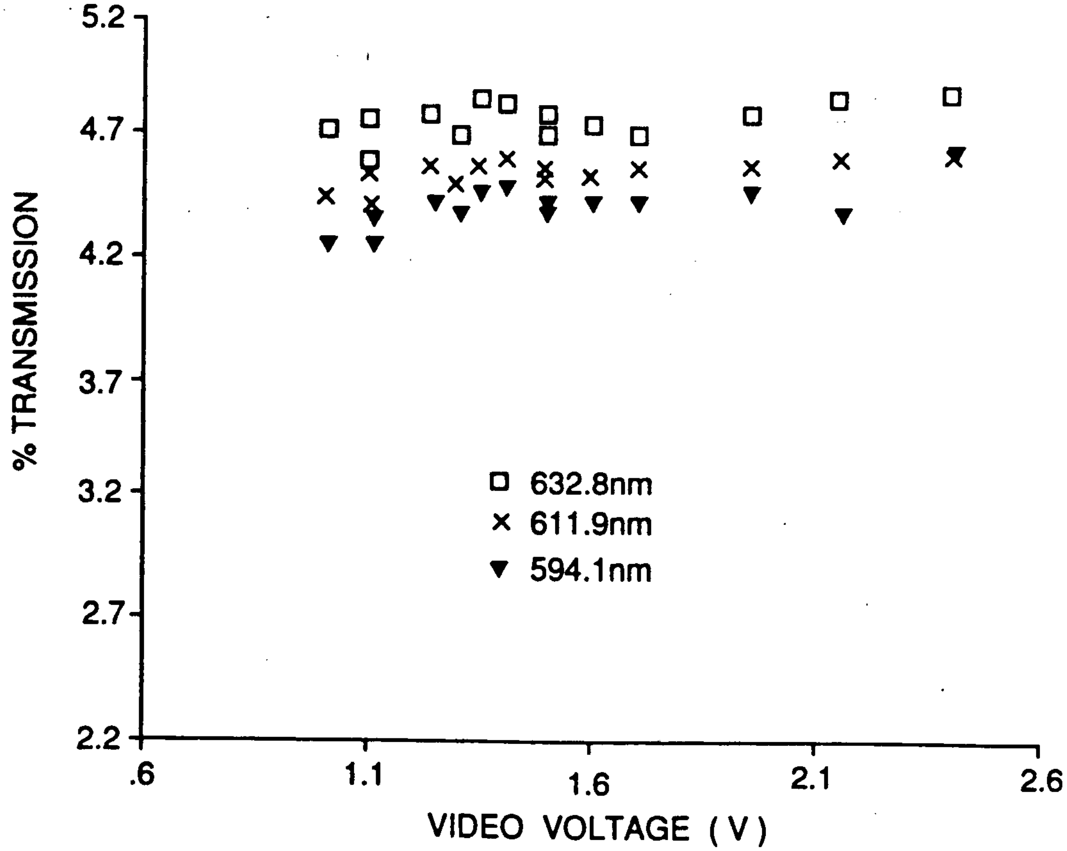
FIG. 7 is a chart of LCTV transmission vs. video voltage.

As mentioned earlier, 0 and 1 are the only pixel values used on the LCTV. We are limited to this binary behavior of the LCTV in spite of the fact that the microcomputer is capable of generating at least 13 different video output voltages (as determined by measuring the peak-to-peak values of an oscilloscope trace of the video signal). FIG. 7 shows the response to the LCTV, in terms of screen transmission, to these different voltage levels, at three different wavelengths (594.1 nm, 611.9 nm, and 632.8 nm). One can see that at each of these wavelengths the transmission acts as a step function, jumping from a transmission minimum to a maximum at a video voltage level of approximately 1.1 volts. Thus, we effectively obtain only two distinct intensity levels from the LCTV.

Based on this result, we can achieve only two intensity values at each pixel—"on" and "off." However, if we treat each pixel column as a linear array of binary emitters, then turning one pixel on or off changes the total output intensity of the device. In this manner, the number of distinct intensity values is limited only by the number of pixels per column. It is clear that an increase in the number of distinct gray levels per pixel (by choice of SLM or video voltage generator) would greatly increase the numerical resolution.

The high resolution screen of the microcomputer is composed of 320 horizontal by 200 vertical pixels. This pattern generated on this screen is reproduced on the 162 by 149 pixel array of the LCTV screen. Due to the mismatch in the vertical direction, turning one pixel row on in the microcomputer display does not necessarily correspond to turning on a single pixel row of the LCTV. It was important to understand how many rows need to be turned on in the microcomputer display in order to obtain a measurable change in the transmitted intensity of the LCTV.

Figure 8:
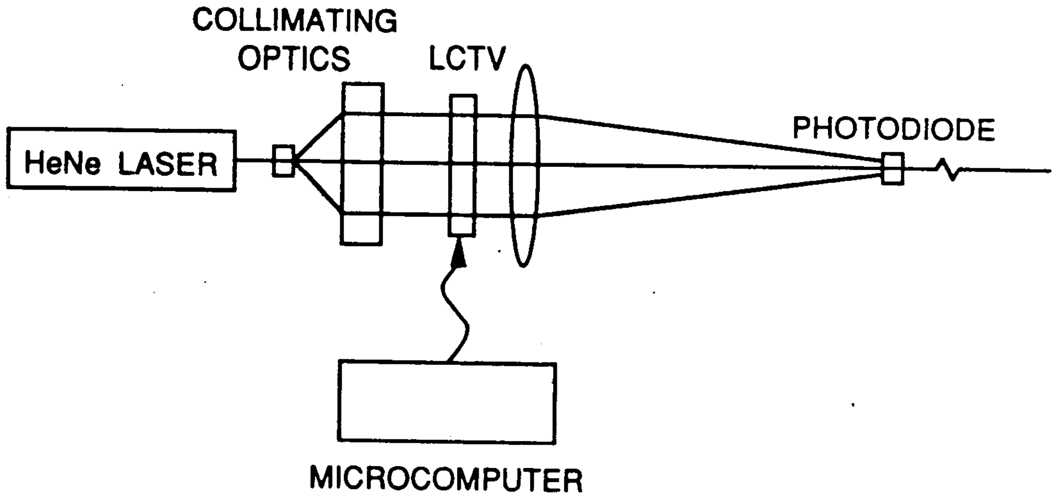
FIG. 8 is a diagram of an apparatus to measure intensity as a function of the number of pixel rows.

We constructed the apparatus shown in FIG. 8, where a collimated HeNe beam impinges on the face of the LCTV screen. The transmitted light is collected by a large diameter lens and focused onto a photodiode. The microcomputer generated a pattern of a four pixel wide white slit in the middle of a black background. In order to perform a measurement, we turned off five microcomputer pixel rows at a time and observed the corresponding change in transmitted intensity through the LCTV. Due to a synchronization mismatch between the LCTV and the microcomputer, several rows of pixels at the top and bottom of the screen were unusable. This limited us to using only pixel rows 30 through 150.

Figure 9:
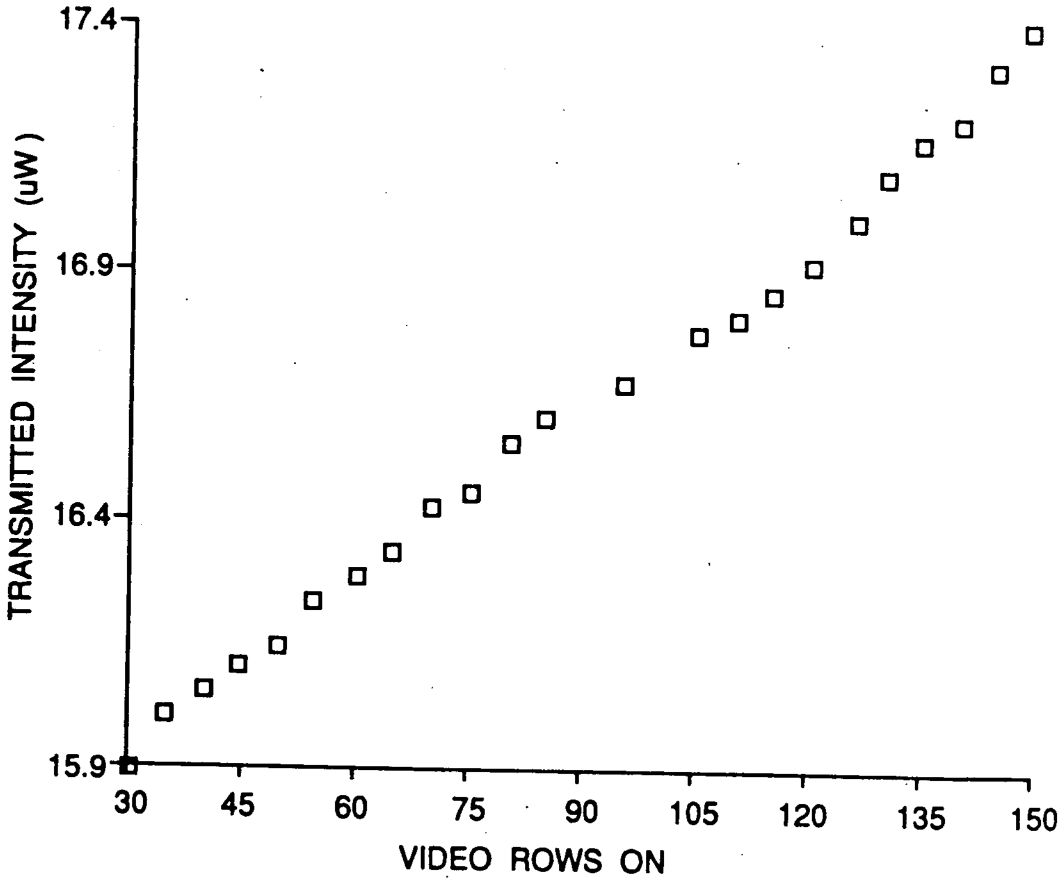
FIG. 9 is a chart of transmitted intensity as a function of the number of pixel rows.

A plot of transmitted intensity as function of number of microcomputer pixel rows (N) turned off is shown in FIG. 9. A linear fit over the range N=30 to 150 has a positive correlation of 0.997. we found that changing 1 or 2 pixel rows on the microcomputer is not always correspond to a definite change in intensity. However, a change of 5 pixel rows resulted in a predictable intensity increase. Therefore, despite the limited gray value scale of the LCTV pixels, using the device as described above, we can achieve at least 24 discrete intensity values.

The present invention includes a new way of using a LCTV as a one dimensional spatial light modulator. It has been shown how it might be incorporated in this manner into an optical architecture to perform adaptive signal processing. Experimental results were presented which verify that the LCTV can be used as a one dimensional SLM with numerical accuracy improved over what is available from the device at the pixel level.

While the invention has been described in its presently preferred embodiment, it is understood that the words which have been used are words of description rather than words of limitation and that changes within the purview of the appended claims may be made without departing from the scope and size of the invention in its broader aspects.

What is claimed is:

1. An optical information system, comprising:
 a laser which emits a laser beam;
 a means for polarizing said laser beam from said laser, said polarizing means thereby outputting a polarized laser beam;
 a means for collimating said polarized laser beam from said polarizing means, said collimating means thereby outputting an optical signal which is used as an optical carrier wave;
 a liquid crystal television which is used as a one dimensional spatial light modulator that modulates said optical carrier wave form from said collimating means with a digital modulating signal to output thereby a modulated optical signal which has digital information; and
 a means for reading said modulated optical signal from said liquid crystal television to obtain thereby said digital information.

2. An optical information system, as defined in claim 1, wherein said reading means comprises: a detector array which receives and electrooptically converts said modulated optical signal from said liquid crystal television into a modulated electrical signal; and a means for demodulating said modulated electrical signal from said detector array to separate said digital information therefrom.

3. An optical information system, as defined in claim 1, which further includes a means for controlling said liquid crystal television by supplying thereto said digital information in said digital modulating signal.

4. An optical information system, as defined in claim 2, which further includes a means for controlling said liquid crystal television by supplying thereto said digital information in said digital modulating signal.

5. An optical information system, as defined in claim 3, wherein said controlling means comprises a microprocessor which is electrically connected with said liquid crystal television to supply thereto said digital modulating signal.

6. An optical information system, as defined in claim 4 wherein said controlling means comprises a microprocessor which is electrically connected with said liquid crystal television to supply thereto said digital modulating signal.

7. An optical information system, as defined in claim 2, wherein said demodulating means comprises an oscilloscope which is electrically connected to said detector array so that it can read and display said modulated electrical signal therefrom and yield said digital information thereby.

8. An optical information system, as defined in claim 3, wherein said demodulating means comprises an oscilloscope which is electrically connected to said detector array so that it can read and display said modulated electrical signal therefrom and yield said digital information thereby.

9. An optical information system, as defined in claim 4, wherein said demodulating means comprises an oscilloscope which is electrically connected to said detector array so that it can read and display said modulated electrical signal therefrom and yield said digital information thereby.

10. An optical information system, as defined in claim 5, wherein said demodulating means comprises an oscilloscope which is electrically connected to said detector array so that it can read and display said modulated electrical signal therefrom and yield said digital information thereby.

* * * * *